INVENTOR
Lessiter C. Milburn
BY
W. B. Churcher
ATTORNEY

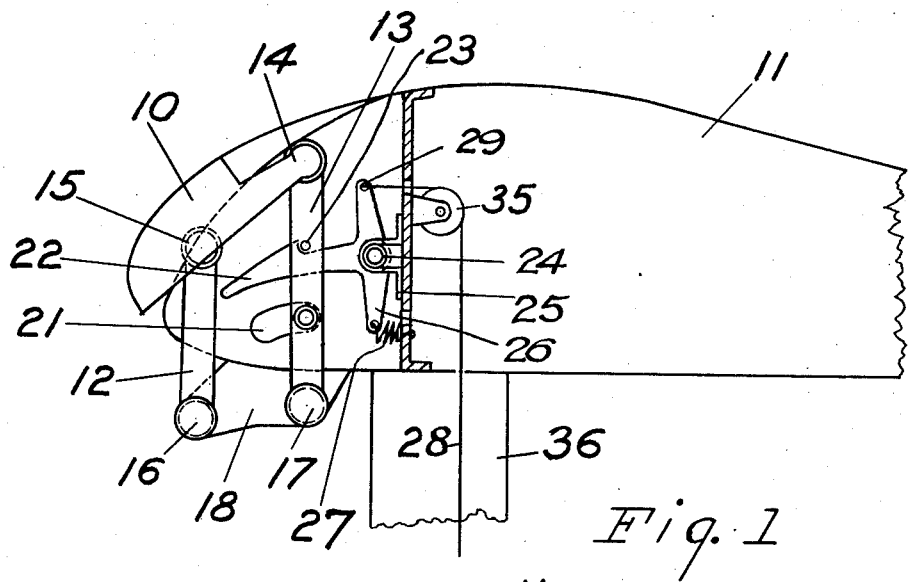
*Fig. 1*
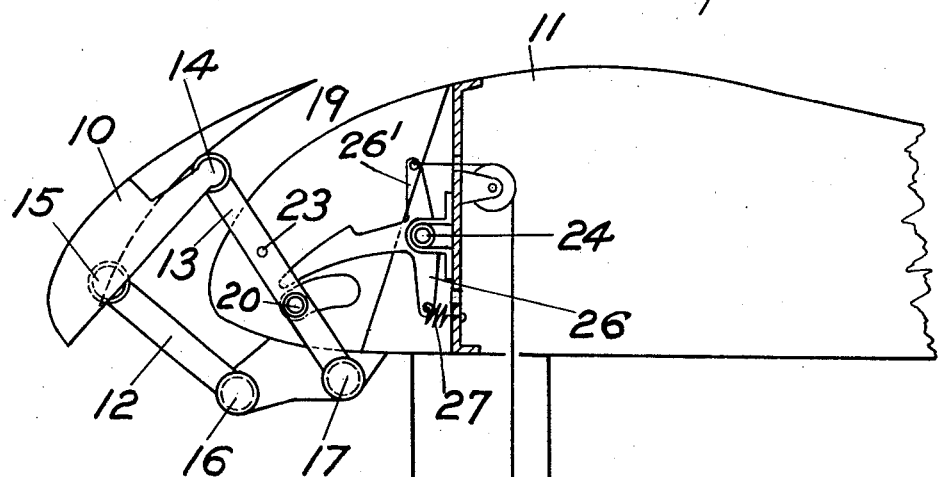
*Fig. 2*
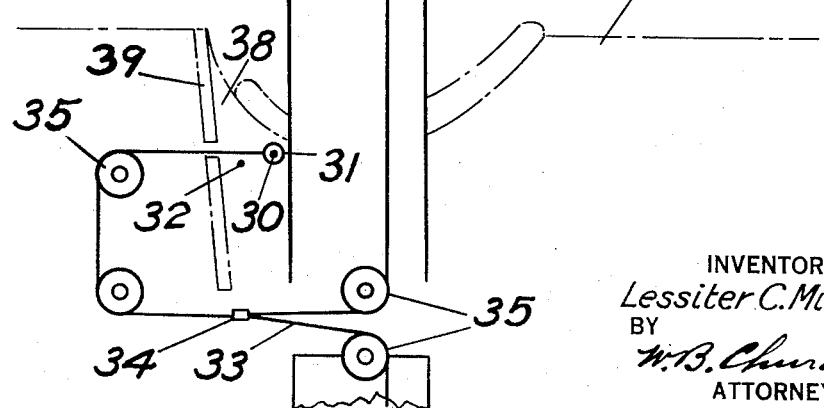
INVENTOR
*Lessiter C. Milburn*
BY
*W. B. Churcher*
ATTORNEY Nov. 3, 1931. L. C. MILBURN 1,830,122
AIRPLANE WING SLOT CONTROL
Filed Nov. 12, 1928 2 Sheets-Sheet 2

Patented Nov. 3, 1931

1,830,122

UNITED STATES PATENT OFFICE

LESSITER C. MILBURN, OF WICKLIFFE, OHIO, ASSIGNOR TO THE GLENN L. MARTIN CO., OF CLEVELAND, OHIO, A CORPORATION OF OHIO

AIRPLANE WING SLOT CONTROL

Application filed November 12, 1928. Serial No. 318,952.

My invention relates to an improvement in the operation and control of wings used as auxiliaries to airplane main wings, the system constituting what is known as a "wing slot" the function of which is well known to those versed in the art. I provide mechanism by which the auxiliary wings can be latched to or released from the main wings at will of the pilot.

Two well known methods of operating an auxiliary wing to open or close the slot are the automatic and the manual types neither of which meets certain conditions encountered in specialized or acrobatic flying.

*Automatic type.*—At "take off" the auxiliary wing slot automatically opens due to the angle of attack being greater than at flying speed. At flying speed the slot automatically closes due to decreased angle of attack. At landing speed the slot automatically opens due to increased angle of attack. Action of the auxiliary wing to open or close the slot is independent of the pilot.

Manual types of auxiliary wing operation require the installation of a multiplicity of mechanisms such as levers, rods, gears and the like which are difficult and expensive to install upon airplanes, especially when equipped with a multiple number of fixed main wings or wings of the folding type. They involve the addition of considerable weight and require physical effort on the part of the pilot for their operation.

Certain conditions of flying require a modified type of auxiliary wing control to more fully utilize the inherent value of automatic wing slots. An example of such a flying maneuver is that of diving from a high altitude to a bombing position and the subsequent rapid climb to a higher altitude. Such a maneuver requires maintenance of high flying speed after the dive. Should the auxiliary wings open under this condition the airplane speed would be materially and suddenly reduced at a critical time. The instant invention provides the pilot with means at his disposal for maintaining the wings in a closed position relative to each other until such time as use of the slots would be advantageous. The effectiveness of the airplane is increased, danger to the pilot and chance of destruction of the airplane are decreased by the installation of my auxiliary wing latch mechanism.

One form of my invention comprises a latch mechanism, or multiplicity of latches, attached to one wing, or to a multiplicity of wings, on an airplane, either the right or left units of which may be selectively restrained to a position out of engagement with retaining members associated with a complementary wing to thus intentionally produce an unbalanced effect. Resilient cable control means associated with the latches of each wing is provided whereby the functioning of either the right or the left auxiliary wing, after automatically closing in respect to the main wing, may be restrained by the pilot when emergency arises during acrobatic flying as described elsewhere in the specification, or for other reasons dictated by the pilot's judgment.

The latch operating means may consists of,—1st, a cable leading from the latch mechanism to a point convenient for operation by the pilot. 2nd, it may take the form of vacuum means of latch operation controlled by the pilot. 3rd, it may take the form of pneumatic pressure means of latch operation controlled by the pilot. 4th, it may take the form of hydraulic pressure means of latch operation controlled by the pilot.

My invention will be more fully understood by reference to the drawings, their description and the explanation of its operation.

Fig. 1 is an elevation section of a fragment of an airplane main wing to which an auxiliary wing is hinge connected and a cable controlled latch mechanism in position to lock the auxiliary wing in a closed position relative to the main wing.

Fig. 2 is an elevation section of a fragment of an airplane main wing with an auxiliary wing in an open position, the application of a cable control for the latch mechanism and their relation to the cockpit of an airplane.

Figure 3:
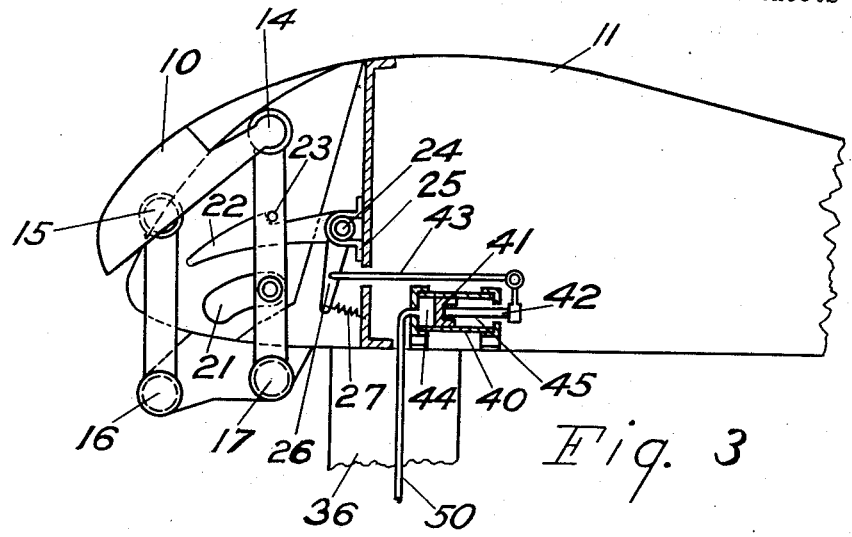

Fig. 3 conforms to Figs. 1 and 2 except that vacuum means of latch control is substituted for cable control of the latches.

Figure 4:
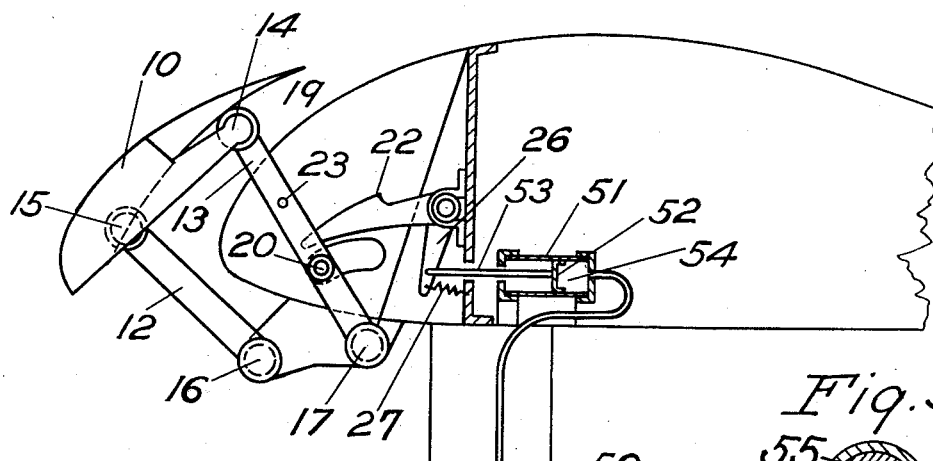

Fig. 4 conforms to Fig. 3 except that fluid pressure means for latch control is substituted for the vacuum means for latch control.

Figure 5:
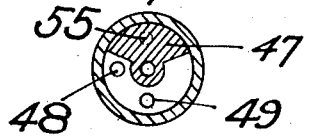

Fig. 5 is a section of the control valve of Fig. 4 when in the "on" position.

Figure 6:
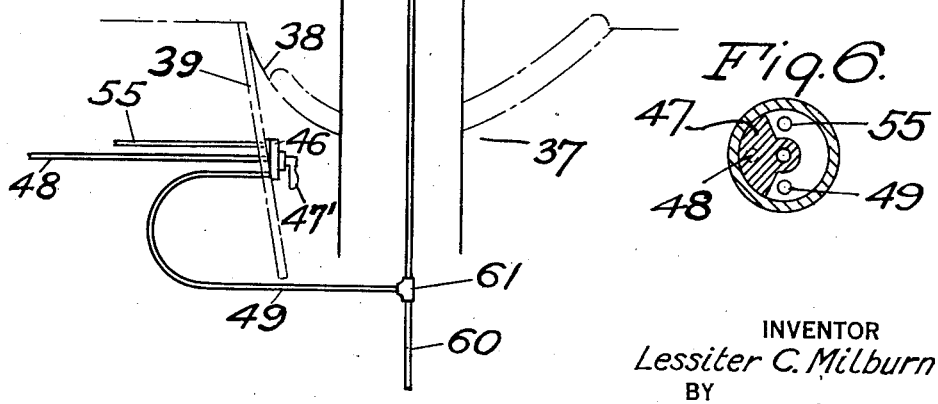

Fig. 6 is a section similar to Fig. 5 but showing the valve when in the "off" position.

It is to be understood from the auxiliary wing drawings and their description that my invention consists of the latch devices and their operating means as distinguished from the wing slots which they control.

Referring to the drawings:

Auxiliary wing 10 is hinge connected to main wing 11 by levers 12—13, pivots 14—15, 16—17, and bracket 18 in a manner to permit the auxiliary wing to advance from the main wing as indicated at 19 in Figs. 2 and 4. The advance movement of wing 10 in relation to wing 11 is limited by stop 20 abutting one end of slot 21. In Figs. 1 and 3, auxiliary wing 10 and main wing 11 are retained in closed relation to each other when latch 22 engages catch 23. Shaft 24, end view shown, extends in a direction substantially parallel with the leading edge of the main wing and is rockably mounted on bracket 25. Shaft 24 can be provided with as many latching mechanisms as conditions require. A lever 26 is fastened to latch shaft 24 and serves to transmit motion to all latches mounted thereon. Tension spring 27 normally restrains latch 22 to a position wherein it does not engage catch 23 and therefore wing 10 is free to advance from wing 11 as shown in Figs. 2 and 4 in response to the air forces created by the angle of attack.

Referring to Figs. 1 and 2, cable 28 is attached at 29 to an extended portion 26′ of lever 26 and leads to a means 30 by which tension can be applied at will of the pilot. A means 31 is provided in a convenient location by which the tension on cable 28 can be maintained. Tension on the cable can be relieved by transferring member 30 to position 32. Cable 33 attached to cable 28 at 34 leads to latch levers associated with a lower wing not shown. Cable guide pulleys 35 are provided where necessary. In Fig. 1, the wings are shown as locked together at 22—23 in response to retraction of lever 26′ by tension applied to cable 28. In Fig. 2, the wings have been permitted to separate by relieving the tension on cable 28. Cable 28 can be conveniently located within a strut indicated at 36 connecting wing 11 with fuselage 37. An instrument board is shown in cockpit 38 at 39.

Referring now to Figs. 3 and 4, the operation of auxiliary wing 10 in relation to wing 11 and the functioning of latch mechanisms 22, 23—24, conforms to the same plan as set forth in the description of Figs. 1-2. In Figs. 3-4, vacuum or fluid pressure control is substituted for the manually operated cable control of Figs. 1-2.

Fig. 3 illustrates a vacuum controlled latch system wherein cylinder 40, piston head 41, piston rod 42, connecting rod 43, are collectively adapted by their design and construction to operation by vacuum in chamber 44 causing atmospheric pressure to act on piston head 41 at 45. The detail construction of fluid pressure cylinder and piston mechanisms is well known to those versed in the art. A conventional two way valve 46, details shown in Figs. 5 and 6 consists of a housing containing a member 47 rotatable by lever 47′ to either of two positions "on" or "off". Tube 48 leads to a source of vacuum not shown and when valve member 47 is turned to the "on" position a vacuum is transmitted through tubes 48, 49, 50 to cylinder chamber 44 thus causing atmospheric pressure to act on piston head 41 at 45 which then acts thru rods 42—43, lever 26, shaft 24, and to cause engagement of latch 22 with latch catch 23 thus retaining auxiliary wing 10 in closed relation to wing 11. Release of wing 10 from wing 11 can then be attained by turning valve member 47 to the "off" position by which atmospheric pressure is admitted through tube 55 to tube 50 and to cylinder chamber 44 to thereby balance the atmospheric pressure on both sides of piston head 41 and to permit spring 27 to release latch 22 from latch catch 23. Auxiliary wing 10 is then free to advance from wing 11 as shown by Fig. 4 in response to air forces created by the angle of attack. Automatic action of wing 10 to open or close slot 19 takes place until such time as the pilot closes latch 22 by operation of valve member 47 to the "on" position.

Fig. 4 illustrates a fluid pressure controlled latch system wherein cylinder 51, piston head 52, piston rod 53, are adapted by their construction to operation by fluid pressure acting on piston head 52 at 54, and to control by valve 46. Tube 48 leads to a source of fluid pressure not shown and when valve member 47 is turned to the "on" position the pressure is transmitted through tubes 49—50 to cylinder chamber 54 and acts on piston head 52 to which piston rod 53 is connected. Piston rod 53 is hinge connected to lever 26 and therefore closes latch 22 and retains auxiliary wing 10 in closed relation to wing 11 as shown in Fig. 3. Operation of valve member 47 to the "off" position releases the pressure from cylinder 54 through pipes 49, 50 and 55, thus permitting spring 27 to open latch 22 which in turn permits auxiliary wing 10 to automatically open in relation to wing 11 as shown in Fig. 4.

In the event of failure of the source of vacuum, Fig. 3; or of fluid pressure Fig. 4; latch 22 is retained in an open position by spring 27 thus permitting wing 10 to automatically open slot 19 previous to landing of the airplane. This provision is important because in the event of failure of the prime mover to supply an operating fluid pressure, or a vacuum; or in the event of failure of a reserve supply of the fluid pressure; or breakage of cable 28, the auxiliary wing is permitted to open in response to air forces produced by the increased angle of attack when landing. Absence of this provision under abnormal conditions would lock the auxiliary wing to the main wing out of control by the pilot, thus destroying its usefulness when most needed.

I do not wish it to be understood that my invention is confined to use with the form of wing hinge shown in the drawings. There are several methods of hinging the auxiliary wing. One of them produces a movement of the auxiliary wing substantially forward of the main wing whereas another produces a compound movement of the auxiliary wing whereby it moves forward substantially with the line of flight and also laterally to the line of flight. It is a matter of variation in detail design to adapt my latch and latch control mechanisms to any form of auxiliary wing movement forwardly or rearwardly from the main wing. A multiple number of auxiliary wings can be used with each main wing and a multiple number of latch control mechanisms can be installed to provide selective control by the pilot.

Having described and illustrated my invention what I claim and upon which I desire to secure Letters Patent is, 1. In combination with an airplane, a main wing; an auxiliary wing hingedly connected to said main wing forward of its leading edge by links adapted to maintain said wings in faired relation to each other when in a closed or in an open position; a latch associated with said main wing; means associated with said auxiliary wing for engaging said latch; means to close said latch into position for engagement with said latch engaging means when said wings close in relation to each other; and resilient means for biasing said latch to releasing position.

2. In combination with an airplane, a main wing; an auxiliary wing forwardly located in parallel relation to the leading edge of said main wing; links hingedly retaining said auxiliary wing in a variable spaced relation to said main wing; a latch associated with said main wing; means associated with said auxiliary wing for engaging said latch; means to close said latch into position for engagement with said latch engaging means when said wings close in relation to each other; and resilient means for biasing said latch to releasing position.

3. In combination with an airplane, a main wing; an auxiliary wing hinge connected to said main wing forward its leading edge by links adapted to maintain said wings in faired relation to each other when in a closed or in an open position; a rock shaft mounted in said main wing parallel with said leading edge; a multiple number of latches associated with said shaft; means associated with said auxiliary wing for engaging said latches; means to rock said shaft to close said latches into position for engagement with said latch engaging means when said wings close in relation to each other; and resilient means for biasing said latches to releasing position.

4. In combination with an airplane, a main wing; an auxiliary wing variably positioned forward of the leading edge of said main wing by hinged links inter-connecting said wings; a latch hingedly connected to said main wing; a catch member attached to said auxiliary wig and adapted to engage said latch when said wings are in closed position; resilient means for restraining said latch to engagement position with said catch; a cable adapted when tensioned by the pilot to release said latch from said catch; and means for maintaining said tension until released by the pilot.

5. In combination with an airplane, a main wing; an auxiliary wing hingedly connected to said main wing forward its leading edge by links adapted to maintain said wings in faired relation to each other when in a closed or in an open position; a latch hingedly connected to said main wing; means associated with said auxiliary wing for engaging said latch; a cable adapted when tensioned by the pilot to close said latch into engagement with said latch engaging means when said wings are in closed relation to each other; and resilient means for releasing said latch from said engaging means after said cable has been released by the pilot.

6. In combination with an airplane, a main wing; an auxiliary wing forwardly located in relation to the leading edge of said main wing and hinge connected thereto by links adapted to maintain the cooperative fairing of said wings when in a closed or in an open relation to each other; a latch hingedly connected to said main wing; a latch engaging means attached to said auxiliary wing; a cable adapted when tensioned by the pilot to close said latch into engagement with said engaging means when said wings are in closed relation to each other; and resilient means for releasing said latch from said engaging means when said cable tension is relieved.

7. In combination with an airplane, a main wing; an auxiliary wing hingedly connected to said main wing forward its leading edge by links adapted to maintain said wings in faired relation when in a closed or in an open position; a latch hingedly connected to said main wing; means associated with said auxiliary wing for engaging said latch; a cable adapted when tensioned by the pilot to close said latch into engagement with said latch engaging means when said wings are in closed position; manually releasable means for maintaining said tension; and resilient means for releasing said latch from said engaging means after said cable tension has been relieved.

8. In combination with an airplane, a main wing; an auxiliary wing hingedly connected to said main wing forward its leading edge by links adapted to maintain said wings in faired relation when in a closed or in an open position; a latch hingedly connected to said main wing; means associated with said auxiliary wing for engaging said latch; a cable adapted when tensioned by the pilot to close said latch into engagement with said latch engaging means when said wings are in closed position; manually releasable means for maintaining said tension; and automatic means for releasing said latch from said engaging means in the event of breakage of said cable.

9. In combination with an airplane, a main wing; an auxiliary wing adapted to nest with the leading edge of said main wing and hinge connected thereto by links adapted to govern projection of said auxiliary wing forward from said main wing; a latch hingedly connected to said main wing; a latch engaging means attached to said auxiliary wing; a cable adapted when tensioned by the pilot to close said latch into engagement with said engaging means when said wings are in closed relation to each other; and resilient means for releasing said latch from said engaging means when said cable tension is relieved.

10. In combination with an airplane, a main wing; an auxiliary wing hingedly connected to said main wing forward its leading edge by links adapted to maintain said wings in faired relation to each other when in a closed or in an open position; a latch hingedly connected to said main wing; spring means for restraining said latch to an open position; means associated with said auxiliary wing for engaging said latch; a pneumatic cylinder and piston mechanism operatively connected to said latch; a source of pneumatic pressure lower than atmospheric pressure, a valve adapted to control said pressures, a pipe connecting said low pressure source with said valve, a pipe connecting said cylinder with said valve, whereby when said valve is opened to said pressure source said piston operates to close said latch to an engaging position with said latch engaging means and when said valve is closed to said pressure and open to atmospheric pressure said piston is operated by atmospheric pressure to close said latch against said spring means.

11. In combination with an airplane, a main wing; an auxiliary wing hingedly connected to said main wing forward its leading edge by links adapted to maintain said wings in faired relation to each other when in a closed or in an open position; a latch hingedly connected to said main wing; spring means for restraining said latch to an open position; means associated with said auxiliary wing for engaging said latch; a fluid pressure cylinder and piston mechanism operatively connected to said latch; a source of fluid pressure higher than atmospheric pressure; a valve adapted to control said pressures, a pipe connecting said high pressure source with said valve; a pipe connecting said cylinder with said valve; whereby when said valve is opened to said pressure source said piston operates to close said latch to an engaging position with said latch engaging means and when said valve is closed to said pressure and open to atmospheric pressure said piston is operated by atmospheric pressure to close said latch against said spring means.

In testimony whereof, I hereunto affix my signature.

LESSITER C. MILBURN.